Figure 1:
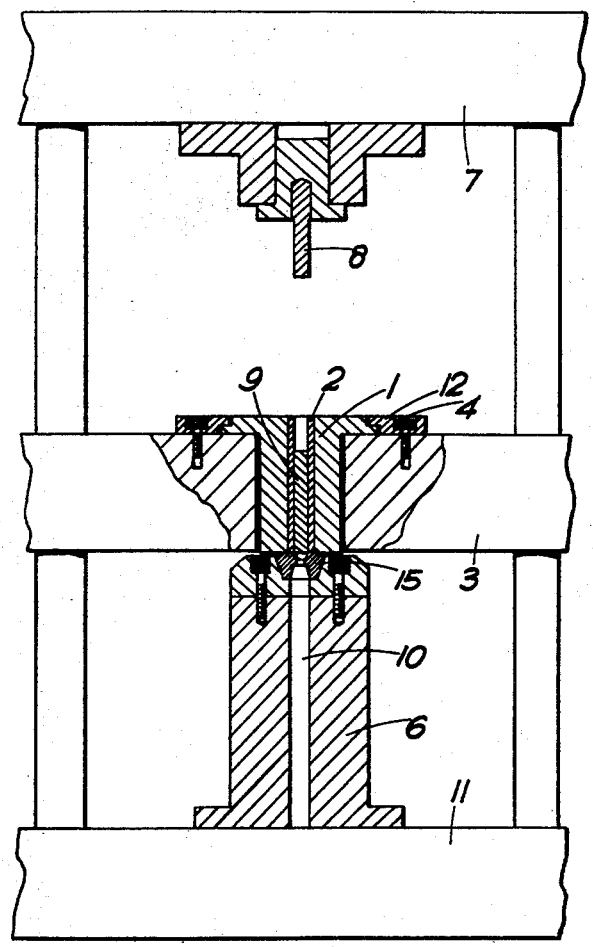

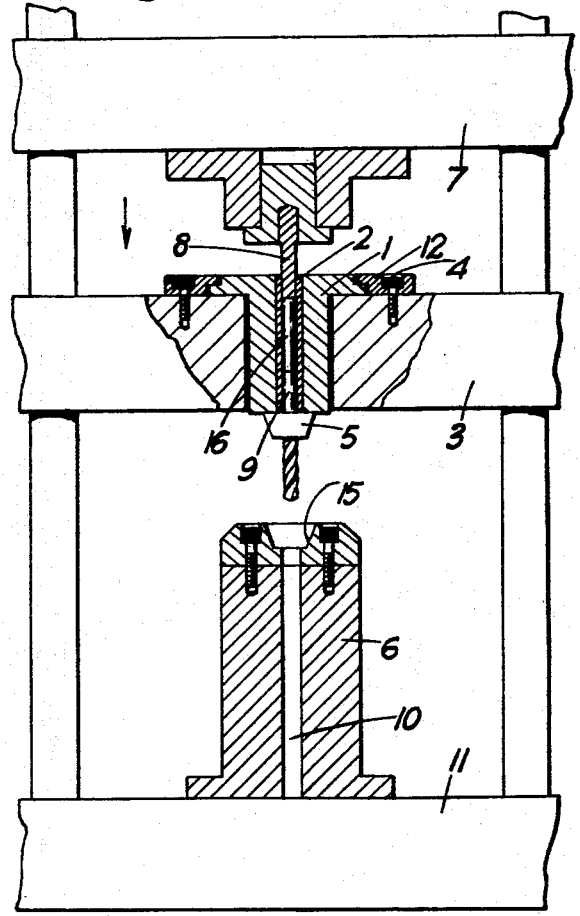

3,190,101
EXTRUSION OF FLUTED ROD-LIKE ARTICLES
William Shiel Caisley, 48 8th Ave., Blyth,
Northumberland, England
Filed Aug. 13, 1963, Ser. No. 301,736
Claims priority, application Great Britain, Aug. 14, 1962,
31,190/62
1 Claim. (Cl. 72—257)

The invention relates to the extrusion of rod-like articles such as twist drill or reamer bodies with either straight or helical flutes and having at one end a shank or shank portion without flutes or with only partially formed flutes.

The invention provides a method for the production of such articles by extrusion which comprises the steps of forcing part of the length of a rod-like blank from a container or guide member therefor through a flute-forming die while supporting the die against movement with the blank, ejecting the remainder of the blank, which forms the shank or shank portion, from the holder while allowing the die to move therewith and removing the die and blank together for subsequent separation.

In the normal carrying out of the method in commercial operation the above steps will be repeated using a second die or further dies and the dies will be returned for re-use, after separation from the formed blanks.

The invention also provides apparatus for use in carrying out the above method and comprising a support, two platens or holders one on each side of the support and both movable relative to the support towards and away from one another, a container or guide member carried by the support between the platens and having a throughway to receive a blank said throughway extending in the direction of relative movement of the platens, a flute-forming extrusion die removably supported by one platen and movable therewith to and from a position in which it is at one end of the throughway aligned therewith, and an extrusion plunger carried by the other platen in alignment with the throughway and operable by movement of said other platen first to force a rod-like blank in the throughway partly through the die, leaving a portion of the blank still in the throughway and then directly or indirectly to eject the blank from the throughway, the die being movable with the blank during such ejection and thereafter removable from the apparatus with the blank.

Preferably the die is of a one-piece construction although segmental or other forms of built-up dies may be used.

It is also preferred that the die is externally of frusto-conical shape and is supported in a seating of similar shape in the said one platen.

A specific embodiment of apparatus according to the invention and the method in which it may be used, will now be described, by way of example, with reference to the accompanying diagrammatic drawings in which:

FIGURE 1 is a vertical section through the apparatus ready to begin extrusion of a twist drill body, and FIGURE 2 is a similar view showing the apparatus after the drill body has been extruded and before ejection thereof.

The apparatus comprises a fixed support 3, an upper platen 7 and a lower platen 11 both movable, by hydraulic rams, towards and away from the fixed support. Fixed on the support 3 there is a guide member or blank container 1 which can be made in one piece but in this example has a lining 2 of wear resistant metal. The container is fixed to the support by a ring 12 and bolts or studs 4. Means, not shown, may be provided for heating the container to minimize heat loss when a preheated blank or slug 9 is employed. Means for heating the die, later described, may also be provided. Temperature responsive means may also be included for controlling the heating means.

A die 5 made, in this example, from a single piece of heat resistant die material (e.g. tungsten carbide or "Stellite"—trademark) is held in a recess, 15, in a pillar 6 upstanding from the platen 11. The die is externally of frusto-conical form and the recess is of a similar shape, the cone angle being sufficiently steep that the two parts do not jam together. Internally the die has a form appropriate to form a fluted twist drill and is shaped by casting, machining or erosion. The pillar 6 has a bore 10 to receive the extruded drill.

The upper platen 7 carries a plunger 8 which is aligned with the throughway in the container 1. The plunger may be an insert, as shown, or integral with the platen or a block attached thereto.

In the operation of the apparatus the lower platen 11 is first raised to bring the top of the die 5 against the lower end of the container and to hold it there. A blank or slug 9, in the form of a short rod of suitable material for a twist-drill, is inserted into the container 1, as seen in FIGURE 1. The upper platen is then moved downwardly so that the plunger 8 enters the container and forces the slug through the die to form the fluted portion of a drill. The movement stops before the slug has been forced completely through the die whereby there is left a portion forming a shank for the drill (see FIGURE 2).

Next the lower platen 11 is lowered leaving the drill held by its shank portion in the container and the die still engaged with the drill, as seen in FIGURE 2.

The upper platen 7 may then be lowered further so that the plunger ejects the shank portion from the container and the drill body, together with the die, may be removed for subsequent separation in an additional operation carried out either manually or mechanically, the die then being re-usable. Alternatively the platen 7 may first be raised, an ejector pin 16 inserted into the container and the platen then lowered so that the plunger operates through the pin 16 to eject the drill body.

The operations may then be repeated, using a fresh die, to produce a further drill body.

The use of a multiplicity of dies obviates the need for cooling, cleaning and lubricating the die in situ between extrusion cycles thereby increasing the rate of production. In general it is also beneficial to leave the die and extruded article in contact as long as possible since thermal equilibrium between the two and the resulting thermal contraction and expansion provides a clearance thus facilitating removal.

The drill body produced as described above, may finally be ground to shape and to sharpen the cutting edges.

The invention is not restricted to the use of a one-piece die or, indeed, to the use of a die shaped to form flutes for a twist drill. The die may be split or built up of segments which are held together in the recess in the pillar 6. Further it may be shaped to produce any suitable section in the work-slug and the term flutes is used herein in a very broad sense to include any form of depression between two parts (e.g. raised by the die) of a cross section.

I claim:

Apparatus for producing, by extrusion, rod-like articles such as twist drills or reamer bodies with either straight or helical flutes and having at one end a shank portion without flutes or with only partially formed flutes which apparatus comprises a support, two platens or holders one on each side of the support and both movable relative to the support towards and away from one another, a container or guide member carried by the support between the platens and having a through-way to receive a blank, said throughway extending in the direction of relative movement of the platens, a flute-forming extrusion die removably supported by one platen and movable therewith to and from a position in which it is at one end of the throughway aligned therewith, and an extrusion plunger carried by the other platen in alignment with the throughway and operably by movement of said other platen first to force a rod-like blank in the throughway partly through the die, leaving a portion of the blank still in the throughway, and then directly or indirectly to eject the blank from the throughway, the die being movable with the blank during such ejection and thereafter removable from the apparatus with the blank.

References Cited by the Examiner
UNITED STATES PATENTS

| | | | |
|---|---|---|---|
| 2,031,008 | 2/36 | Schwerak | 207—17 |
| 2,392,175 | 1/46 | Norton | 207—10 |
| 2,539,564 | 1/51 | Barrett | 207—10 |
| 2,764,042 | 9/56 | Gotze | 207—17 |
| 2,836,295 | 5/58 | Muller et al. | 207—2 |
| 3,019,894 | 2/62 | Delcroix et al. | 207—1.1 |
| 3,028,006 | 4/62 | Petsch et al. | 207—1 |
| 3,139,183 | 6/64 | Elkan et al. | 207—1 |

CHARLES W. LANHAM, *Primary Examiner.*

MICHAEL V. BRINDISI, *Examiner.*